US011516405B2

(12) United States Patent
Zhang et al.

(10) Patent No.: US 11,516,405 B2
(45) Date of Patent: Nov. 29, 2022

(54) ELECTRONIC DEVICES AND METHOD FOR CONTROLLING CAMERA MODULE

(71) Applicant: GUANGDONG OPPO MOBILE TELECOMMUNICATIONS CORP., LTD., Guangdong (CN)

(72) Inventors: Xiang Zhang, Guangdong (CN); Zanjian Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/944,966

(22) Filed: Jul. 31, 2020

(65) Prior Publication Data

US 2020/0366851 A1 Nov. 19, 2020

Related U.S. Application Data

(63) Continuation of application No. PCT/CN2018/121819, filed on Dec. 18, 2018.

(30) Foreign Application Priority Data

Feb. 13, 2018 (CN) .......................... 201810150794.8

(51) Int. Cl.
*H04N 5/232* (2006.01)
*G06F 1/16* (2006.01)
*H04N 5/225* (2006.01)

(52) U.S. Cl.
CPC ....... *H04N 5/23299* (2018.08); *G06F 1/1686* (2013.01); *H04N 5/2257* (2013.01)

(58) Field of Classification Search
CPC ............. H04N 5/23299; H04N 5/2257; H04N 5/2259; H04N 5/2251; H04N 5/23296;
(Continued)

(56) References Cited

U.S. PATENT DOCUMENTS

| 10,579,108 B2 | 3/2020 | Dilaura |
| 10,601,969 B2 | 3/2020 | Bao |

(Continued)

FOREIGN PATENT DOCUMENTS

| CN | 2717138 Y | 8/2005 |
| CN | 201967013 U | 9/2011 |

(Continued)

OTHER PUBLICATIONS

Decision for rejection with English Translation issued in corresponding CN application No. 201810150737.X dated Dec. 14, 2020.

(Continued)

*Primary Examiner* — Nelson D. Hernández Hernández
(74) *Attorney, Agent, or Firm* — Young Basile Hanlon & MacFarlane, P.C.

(57) ABSTRACT

An electronic device and a method for controlling a camera module are provided. The electronic device includes a housing, a camera module, a rotating mechanism, and a pushing mechanism. The camera module disposed in the housing. The rotating mechanism is configured to drive the camera module to rotate in the housing. The pushing mechanism is configured to drive the camera module to an outside of the housing when the camera module rotates to a preset orientation.

18 Claims, 13 Drawing Sheets

(58) Field of Classification Search
CPC .. H04N 5/2252; G06F 1/1686; H04M 1/0208; H04M 1/0264; H04M 2250/20
See application file for complete search history.

(56) References Cited

U.S. PATENT DOCUMENTS

| | | | | |
|---|---|---|---|---|
| 2004/0245342 | A1* | 12/2004 | Cho | H04N 5/2254 348/E7.079 |
| 2005/0220451 | A1* | 10/2005 | Cho | H04N 5/2254 396/349 |
| 2010/0053409 | A1 | 3/2010 | Chang | |
| 2016/0316046 | A1 | 10/2016 | Zheng | |
| 2016/0337492 | A1 | 11/2016 | Tseng | |
| 2017/0244903 | A1* | 8/2017 | Yang | H04N 5/232933 |
| 2020/0366851 | A1 | 11/2020 | Zhang et al. | |

FOREIGN PATENT DOCUMENTS

| | | |
|---|---|---|
| CN | 203423741 U | 2/2014 |
| CN | 203722706 U | 7/2014 |
| CN | 203933810 U | 11/2014 |
| CN | 203984539 U | 12/2014 |
| CN | 204103976 U | 1/2015 |
| CN | 204216968 U | 3/2015 |
| CN | 204652455 U | 9/2015 |
| CN | 105049686 A | 11/2015 |
| CN | 106331450 A | 1/2017 |
| CN | 106850896 A | 6/2017 |
| CN | 106856516 A | 6/2017 |
| CN | 104038683 B | 7/2017 |
| CN | 107197133 A | 9/2017 |
| CN | 107257398 A | 10/2017 |
| CN | 107295129 A | 10/2017 |
| CN | 206894706 U | 1/2018 |
| CN | 107682610 A | 2/2018 |
| JP | 2005223634 A | 8/2005 |
| KR | 20050088771 A | 9/2005 |
| KR | 100626977 B1 | 9/2006 |
| WO | 0163926 A1 | 8/2001 |

OTHER PUBLICATIONS

Partial Supplementary European Search Report for EP Application 18906263.1 dated Jun. 10, 2021. (20 pages).
Indian Examination Report for IN Application 202017025480 dated Aug. 17, 2021. (7 pages).
Indian Examination Report for IN Application 202017026423 dated Aug. 16, 2021. (6 pages).
Chinese Notice of reexamination with English Translation for CN Application 201810150737.X dated Aug. 13, 2021. (20 pages).
Extended European Search Report for EP Application 18906608.7 dated Mar. 12, 2021. (10 pages).
Non-Final Rejection for U.S. Appl. No. 16/990,492 dated Oct. 28, 2021. (30 pages).
Extended European Search Report for EP Application 18906263.1 dated Oct. 11, 2021. (4 pages).
Chinese Office Action with English Translation for JP Application 201810150737.X dated Nov. 30, 2021. (28 pages).
English translation of International search report issued in corresponding international application No. PCT/CN2018/121819 dated Feb. 28, 2019.
English translation of Office Action 1 issued in corresponding CN application No. 201810150794.8 dated Dec. 31, 2019.
English translation of Office Action 1 issued in corresponding CN application No. 201810150737.X dated Dec. 13, 2019.
English translation of Office Action 2 issued in corresponding CN application No. 201810150737.X dated Jul. 8, 2020.
English translation of International search report issued in corresponding international application No. PCT/CN2018/121828 dated Mar. 15, 2019.

* cited by examiner

ELECTRONIC DEVICES AND METHOD FOR CONTROLLING CAMERA MODULE

CROSS-REFERENCE TO RELATED APPLICATION(S)

This application is a continuation of International Patent Application No. PCT/CN2018/121819, filed on Dec. 18, 2018, which claims priority to Chinese Patent Application Serial No. 201810150794.8, filed on Feb. 13, 2018, the disclosures of both of which are hereby incorporated by reference in their entireties.

TECHNICAL FIELD

This disclosure relates to the technical field of electronic devices, and in particular, to electronic devices and a method for controlling a camera module.

BACKGROUND

With advances in science and technology and the development in society, network technologies and intelligence of electronic devices are improved, and users can shoot through the electronic devices.

Generally, the electronic device has a shooting function. The electronic device is usually provided with a front camera and a rear camera. The electronic device can switch between the front camera and the rear camera while shooting. The front camera is mainly for selfies.

With increasing requirements of the users, how to increase a screen-to-body ratio of the electronic device for a more extreme display experience has become a hot research topic. However, in order to install the front camera, the electronic device now inevitably needs to define an additional opening or non-display region on a display screen of the electronic device, resulting in a reduction in an area of a display region of the display screen.

SUMMARY

Electronic devices and a method for controlling a camera module are provided according to implementations of the present disclosure.

An electronic device is provided according to the implementations of the present disclosure. The electronic device includes a housing, a camera module, a rotating mechanism, and a pushing mechanism. The camera module is disposed in the housing. The rotating mechanism is configured to drive the camera module to rotate in the housing. The pushing mechanism is configured to drive the camera module to an outside of the housing when the camera module rotates to a preset orientation.

A method for controlling a camera module applicable to an electronic device is further provided. The electronic device includes a housing, a camera module, a pushing mechanism, and a rotating mechanism. The camera module, the pushing mechanism, the rotating mechanism, and a processor are all disposed in the housing, and the pushing mechanism and the rotating mechanism are electrically coupled with the processor. The method for controlling the camera module includes the following. An operation instruction is acquired. The processor starts the rotating mechanism in response to the operation instruction to drive the camera module to rotate in the housing. The processor starts the pushing mechanism to drive the camera module to an outside of the housing when the camera module is rotated to a preset orientation.

BRIEF DESCRIPTION OF DRAWINGS

To describe technical solutions in the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other obvious variations based on these accompanying drawings without creative efforts.

DETAILED DESCRIPTION

Figure 1:
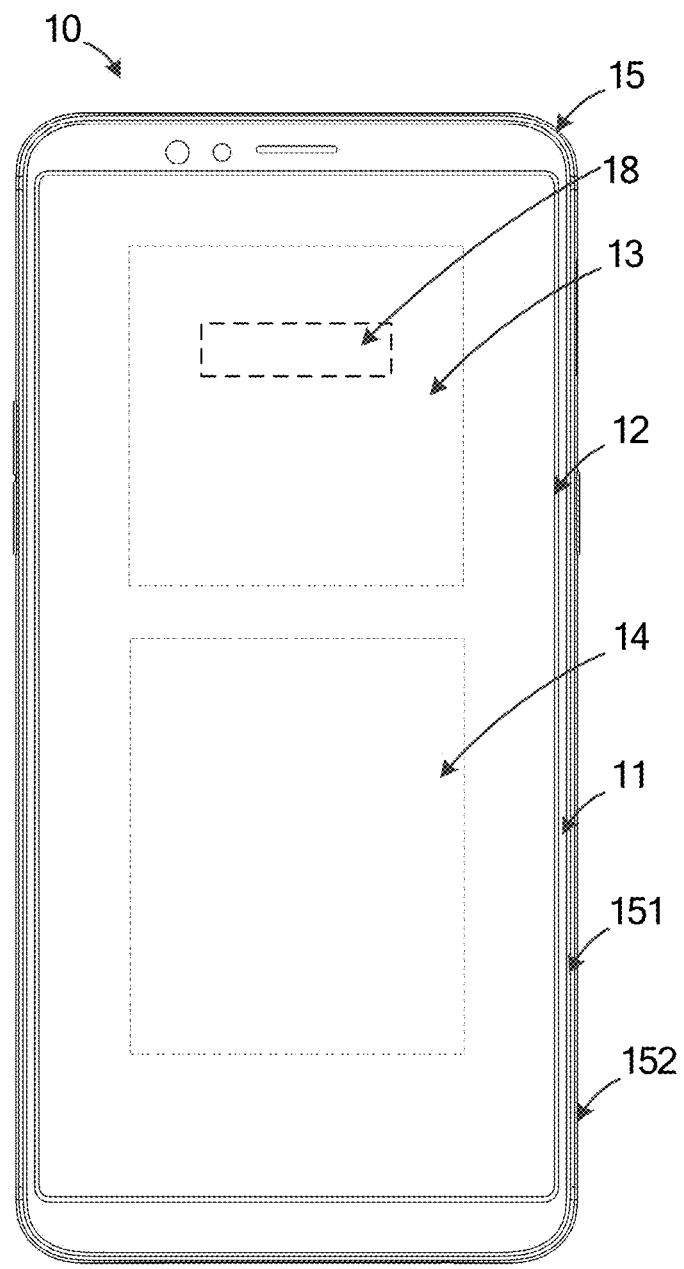
FIG. 1 is a front view of an electronic device according to an implementation of the present disclosure.

The technical solutions in the implementations of the present disclosure are clearly and completely described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

An electronic device is provided according to the implementations of the present disclosure. The electronic device includes a housing, a camera module, a rotating mechanism, and a pushing mechanism. The camera module is disposed in the housing. The rotating mechanism is configured to drive the camera module to rotate in the housing. The pushing mechanism is configured to drive the camera module to an outside of the housing when the camera module rotates to a preset orientation.

In an implementation, when the camera module at the preset orientation is moved to the outside of the housing, the camera module is able to be used as a front camera.

In an implementation, when the camera module at the preset orientation is moved to the outside of the housing, the camera module is able to be used as a rear camera.

In an implementation, the rotating mechanism is configured to drive the camera module to reverse about a lateral axis of the camera module.

In an implementation, the rotating mechanism is configured to drive the camera module to reverse about a longitudinal axis of the camera module.

In an implementation, the electronic device includes a display surface and a non-display surface opposite the display surface, and the pushing mechanism is configured to drive the camera module to move in a direction parallel to the display surface.

In an implementation, the pushing mechanism is configured to drive the camera module to move beyond a first sidewall of the housing from an inside of the housing.

In an implementation, the pushing mechanism is configured to drive the camera module to move beyond a fourth sidewall of the housing from an inside of the housing.

In an implementation, the pushing mechanism is configured to drive the camera module to move beyond a second sidewall of the housing from an inside of the housing.

In an implementation, the pushing mechanism is configured to drive the camera module to move beyond a third sidewall of the housing from an inside of the housing.

In an implementation, the rotating mechanism includes a driving motor and a telescopic rod. The driving motor is fixedly connected with the telescopic rod, the telescopic rod is coupled with the camera module, and the driving motor is configured to drive the telescopic rod to rotate, and a rotation of the telescopic rod enables the camera module to rotate.

In an implementation, the camera module has a first surface close to a periphery of the housing and a second surface opposite the first surface. The pushing mechanism includes a first magnetic member and a second magnetic member. The first magnetic member is disposed on the second surface of the camera module, and the second magnetic member is disposed in the housing and faces the first magnetic member.

In an implementation, the telescopic rod is in parallel with a longitudinal axis of the electronic device.

In an implementation, the telescopic rod includes a first rod and a second rod, the second rod is sleeved on the first rod, and the first rod is operable to move in the second rod along a longitudinal direction of the second rod.

In an implementation, the electronic device further includes a sensor disposed in the housing and configured to detect an orientation of the camera module. When the orientation detected by the sensor is the same as the preset orientation of the camera module, the pushing mechanism is configured to drive the camera module to move to the outside of the housing.

An electronic device is further provided according to the implementations of the present disclosure. The electronic device includes a housing, a camera module, a pushing mechanism, a rotating mechanism, and a processor. The camera module, the pushing mechanism, the rotating mechanism, and the processor are all disposed in the housing. The pushing mechanism and the rotating mechanism are electrically coupled with the processor. The processor is configured to control the rotating mechanism to drive the camera module to rotate in the housing. The processor is configured to control the pushing mechanism to drive the camera module to move to an outside of the housing when the camera module is at a preset orientation.

In an implementation, when the camera module at the preset orientation is moved to the outside of the housing, the camera module is able to be used as the front camera.

In an implementation, when the camera module at the preset orientation is moved to the outside of the housing, the camera module is able to be used as a rear camera.

In an implementation, the rotating mechanism is configured to drive the camera module to reverse about a lateral axis of the camera module.

In an implementation, the electronic device includes a display surface and a non-display surface opposite the display surface, and the housing has four sidewalls surrounding the display surface. The pushing mechanism is configured to drive the camera module to move beyond any one of the four sidewalls from an inside of the housing.

In an implementation, the rotating mechanism includes a driving motor and a telescopic rod, where the driving motor is fixedly connected with the telescopic rod, the telescopic rod is coupled with the camera module, the driving motor is configured to drive the telescopic rod to rotate, and a rotation of the telescopic rod enables the camera module to rotate.

In an implementation, the camera module has a first surface close to a periphery of the housing and a second surface opposite the first surface. The pushing mechanism includes a first magnetic member and a second magnetic member, where the first magnetic member is disposed on the second surface of the camera module, and the second magnetic member is disposed in the housing and faces the first magnetic member.

A method for controlling a camera module applicable to the electronic device is further provided according to the present disclosure. The electronic device includes a housing, a camera module, a pushing mechanism, and a rotating mechanism. The camera module, the pushing mechanism, the rotating mechanism, and a processor are all disposed in the housing. The pushing mechanism and the rotating mechanism are electrically coupled with the processor. The method for controlling the camera module includes the followings. An operation instruction is acquired. The processor starts the rotating mechanism in response to the operation instruction to drive the camera module to rotate in the housing. The processor starts the pushing mechanism to drive the camera module to an outside of the housing when the camera module is rotated to a preset orientation.

In an implementation, the processor starts the rotating mechanism in response to the operation instruction to drive the camera module to rotate in the housing as follows. The processor starts the rotating mechanism in response to the operation instruction to drive the camera module to rotate in the housing about one of a lateral axis or a longitudinal axis of the camera module.

In an implementation, the processor starts the pushing mechanism to drive the camera module to move beyond any one of four sidewalls of the housing when the camera module is rotated to the preset orientation, where the four sidewalls of the housing surround a display surface of the electronic device.

According to the above-mentioned electronic devices and the method for controlling the camera module applicable to the electronic device, an increased screen-to-body ratio of the electronic device is provided.

The electronic devices are provided according to implementations of the present disclosure, and details will be described below. The electronic devices may include a smart phone, a tablet computer, or the like.

Figure 2:
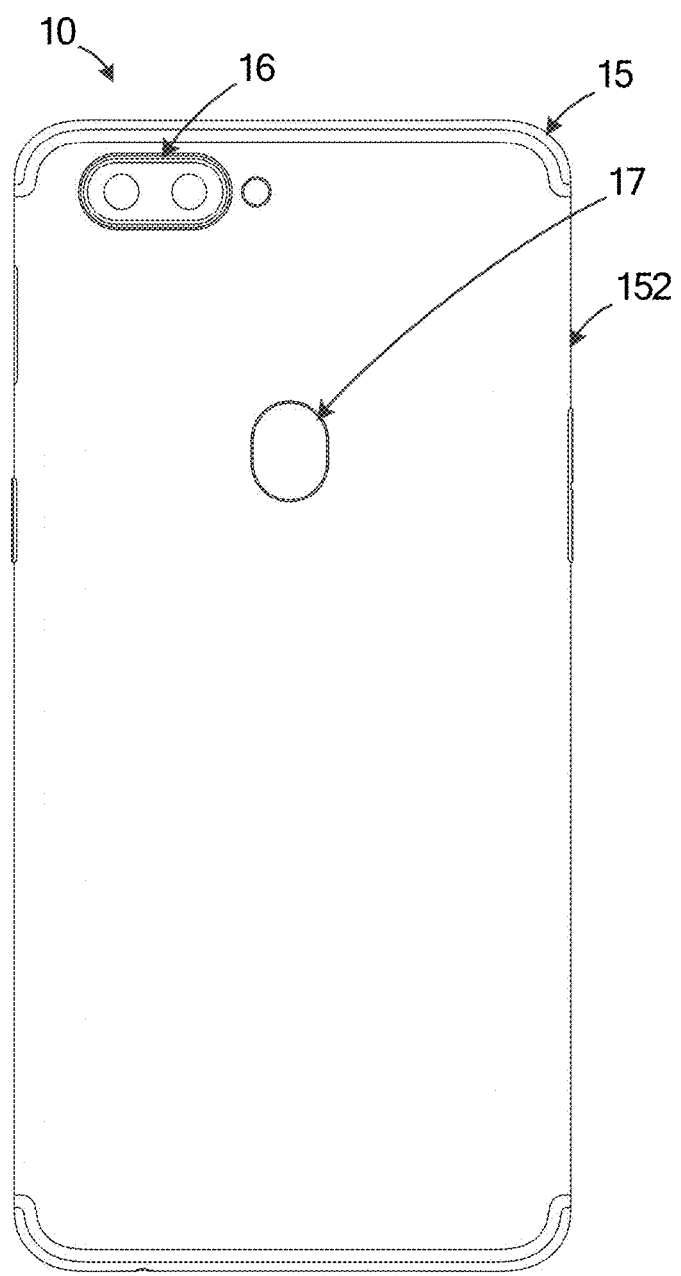
FIG. 2 is a structural rear view of the electronic device illustrated in FIG. 1 according to an implementation of the present disclosure.

FIG. 1 is a front view of an electronic device 10 according to an implementation of the present disclosure. FIG. 2 is a rear view of the electronic device 10 according to an implementation of the present disclosure. The electronic device 10 includes a cover plate 11, a display screen 12, a printed circuit board 13, a battery 14, a housing 15, and a camera module 16. In an implementation, the electronic device 10 further includes a fingerprint module 17 and a sensor 18. It is noted that the electronic device 10 illustrated in FIG. 1 and FIG. 2 may also include other elements and is not limited to the above elements. In an implementation, the electronic device 10 may not include the camera module 16 or the fingerprint module 17.

In an implementation, the cover plate 11 is disposed on and covers the display screen 12. The cover plate 11 may be made of transparent glass, such that light emitted from the display screen 12 can transmit through the cover plate 11. In some implementations, the cover plate 11 may be a glass plate, for example, may be made of sapphire.

In an implementation, the housing 15 may include a middle frame 151 and a rear cover 152. The middle frame 151 and the rear cover 152 together form the housing 15. The middle frame 151 and the rear cover 152 cooperatively define an accommodating space for receiving elements such as the printed circuit board 13, the display screen 12, the battery 14, and the like. In an implementation, the cover plate 11 can be fixed to the housing 15. The cover plate 11 and the housing 15 cooperatively form an enclosed space for accommodating the elements such as the printed circuit board 13, the display screen 12, the battery 14, and the like. In some implementations, the cover plate 11 is coupled with the middle frame 151, the rear cover 152 is coupled with the middle frame 151, and the cover plate 11 and the rear cover 152 are respectively disposed on opposite sides of the middle frame 151.

In some implementations, the housing 15 may be made of metal such as magnesium alloy, stainless steel, or the like. It is noted that a material of the housing 15 in the implementations of the present disclosure is not limited thereto, and other materials may also be employed for manufacturing the housing 15. For example, the housing 15 may be a plastic housing. For another example, the housing 15 may be a ceramic housing. For yet another example, the housing 15 may include a plastic part and a metal part, that is, the housing 15 may be formed via cooperation of metal and plastic. In an implementation, a magnesium alloy substrate is first formed by metal injection molding and serves as the metal part of the housing 15, and then a plastic substrate is formed by plastic injection molding and serves as the plastic part of the housing 15, such that the plastic part and the metal part together form the housing 15.

It is noted that a structure of the housing 15 according to the implementations of the present disclosure is not limited thereto. For example, in an implementation, the rear cover 152 and the middle frame 151 are integrally formed as the housing 15. The housing 15 defines the accommodating space for receiving the elements such as the printed circuit board 13, the display screen 12, the battery 14, and the like.

In an implementation, the printed circuit board 13 is disposed in the housing 15. The printed circuit board 13 may be a mainboard of the electronic device 10. The printed circuit board 13 may be integrated with at least one of functional components such as a motor, a microphone, a speaker, an earphone jack, a universal serial bus interface, the camera module 16, a distance sensor, an ambient light sensor, a receiver, a processor, and the like.

It is noted that the camera module 16 may include a camera. The camera may include a single camera, double cameras, or multiple cameras. It is noted that the camera module 16 is not limited thereto. The camera module 16 may further include functional components such as a flashlight, an earpiece, a microphone, a light sensor, and the like. In addition, a structure of the camera module 16 can be changed and determined according to needs, and will not be repeated herein.

In an implementation, the camera module 16 includes a first surface close to a periphery of the housing 15 and a second surface opposite the first surface.

In an implementation, the middle frame 151 may serve as the periphery of the housing 15.

In some implementations, the printed circuit board 13 may be fixed in the housing 15. For example, in an implementation, the printed circuit board 13 may be connected to the middle frame 151 via screws. Alternatively, the printed circuit board 13 may be snap-fitted to the middle frame 151. It is noted that a manner in which the printed circuit board 13 is coupled with the middle frame 151 according to the implementations of the present disclosure is not limited herein. In an implementation, the printed circuit board 13 may also be coupled with the middle frame 151 in other manners, for example, by snap-fitting and screws.

The battery 14 is mounted in the housing 15, and the battery 14 is electrically coupled with the printed circuit board 13 to provide power to the electronic device 10. The housing 15 may serve as a cover covering the battery 14. The housing 15 covers the battery 14 to protect the battery 14. In an implementation, the rear cover 152 covers the battery 14 to prevent the battery 14 from being damaged when the electronic device 10 is subjected to collisions, drops, or the like.

The display screen 12 is mounted in the housing 15. The display screen 12 is electrically coupled with the printed circuit board 13 and serves as a display surface of the electronic device 10. The display screen 12 may include a display region and a non-display region. The display region is configured to display contents of the electronic device 10 or to receive touch operations from a user. The non-display region has an upper region and a lower region. The upper region of the non-display region defines openings for transmission of sound and light. The lower region of the non-display region may be provided with functional components such as a fingerprint module, a touch key, and the like. The cover plate 11 is disposed on the display screen 12 to cover the display screen 12. The cover plate 11 may have regions the same as or different from the display region and the non-display region of the display screen 12. In an implementation, the cover plate 11 may have a light transmitting region and a light blocking region. The light transmitting region and the light blocking region of the cover plate 11 may be the same as or different from the display region and the non-display region of the display screen 12 in shapes and dimensions.

Figure 3:
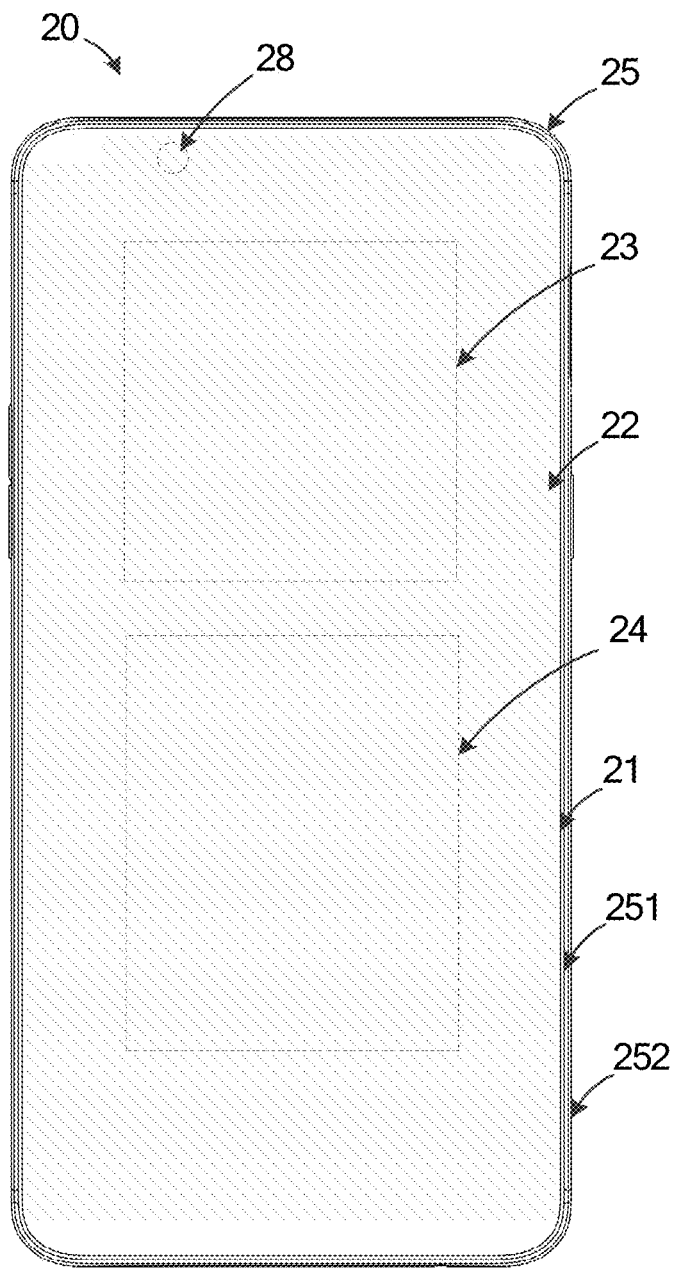
FIG. 3 is a schematic structural view of an electronic device according to an implementation of the present disclosure.

It is noted that a structure of the display screen 12 is not limited thereto. For example, in an implementation, the display screen 12 may be a special-shaped screen (that is, a screen includes an incomplete region that does not belong to a display region and cannot display contents). FIG. 3 is a schematic structural view of another electronic device according to an implementation of the present disclosure. An electronic device 20 illustrated in FIG. 3 differs from the electronic device 10 illustrated in FIG. 1 in that the electronic device 20 includes a display screen 22, a cover plate 21, a printed circuit board 23, a battery 24, and a housing 25. The display screen 22 defines a light transmitting region 28. For example, the display screen 22 defines a through hole extending through the display screen 22 in a thickness direction of the display screen 22. The light transmitting region 28 may include the through hole. Functional components such as a front camera, an earpiece, the sensor 18, and the like may be disposed in or facing the through hole. For another example, the display screen 22 has a non-display region, and the light transmitting region 28 may include the non-display region. The display screen 22 is a fully displayer with the through hole defined on the display screen 22. In an implementation, the cover plate 21 matches the display screen 22 in structure. It is noted that, for structures of the housing 25, the printed circuit board 23, and the battery 24, references can be made to the housing 15, the printed circuit board 13, and the battery 14 respectively, which are not repeated herein.

Figure 4:
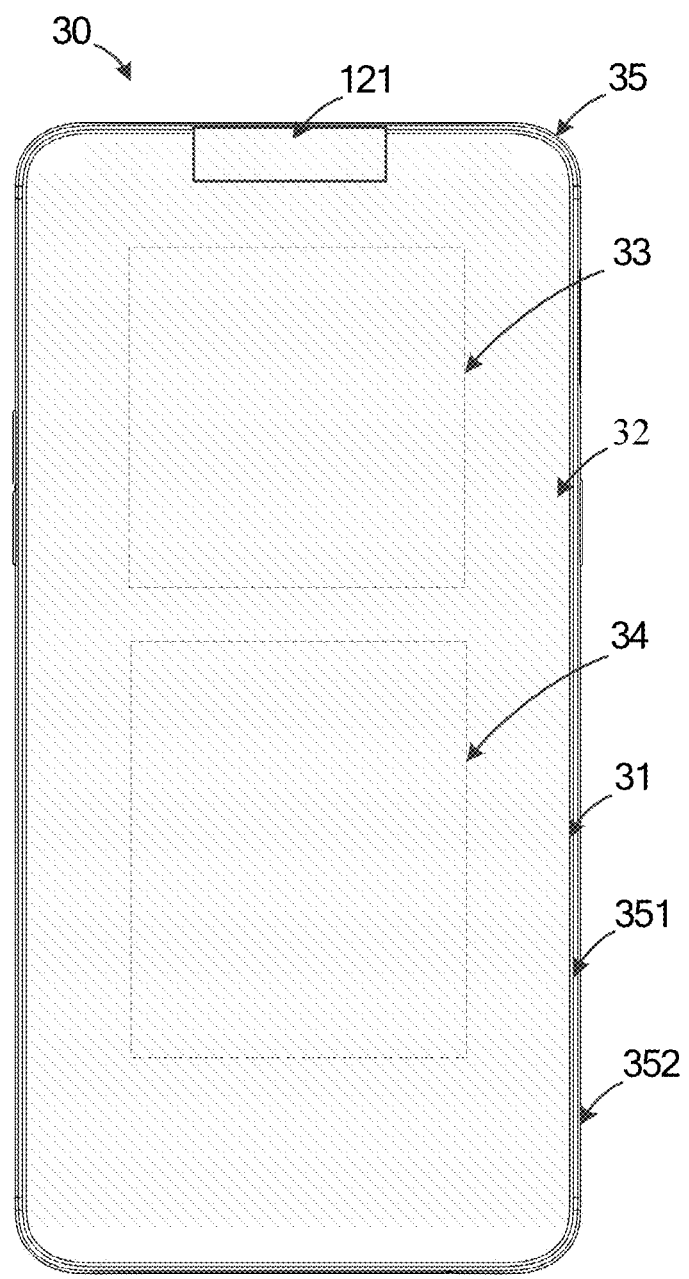
FIG. 4 is a schematic structural view of an electronic device according to an implementation of the present disclosure.

FIG. 4 is a schematic structural view of another electronic device according to an implementation of the present disclosure. An electronic device 30 illustrated in FIG. 4 differs from the electronic device 10 illustrated in FIG. 1 in that the electronic device 30 includes a display screen 32, a cover plate 31, a printed circuit board 33, a battery 34, and a housing 35. The display screen 32 defines a notch 112 at a periphery of the display screen 32. The elements such as the front camera, the earpiece, the sensor 18, and the like may be disposed in or facing the notch. The cover plate 31 matches the display screen 22 in structure. In an implementation, the cover plate 31 may also define a notch facing the notch 121 and having same dimensions as the notch 121. Alternatively, the cover plate 31 covers the notch 121. It is noted that, for structures of the housing 35, the printed circuit board 33, and the battery 34, references can be made to the housing 15, the printed circuit board 13, and the battery 14 respectively, which are not repeated herein.

It is noted that, in some implementations, there is no non-display region formed on the display screen 12, that is, the display screen 12 is a full-screen. The functional components such as the distance sensor, the ambient light sensor, and the like may be disposed below the display screen 12 or at other positions.

In some implementations, the display screen 12 may be a liquid crystal display (LCD), an organic light-emitting diode (OLED) display, or any other type. In some implementations, when the display screen 12 is a LCD screen, the electronic device 10 may further include a backlight module (which is not illustrated in figures). For the backlight module, reference can be made to backlight modules in the related art.

Figure 5:
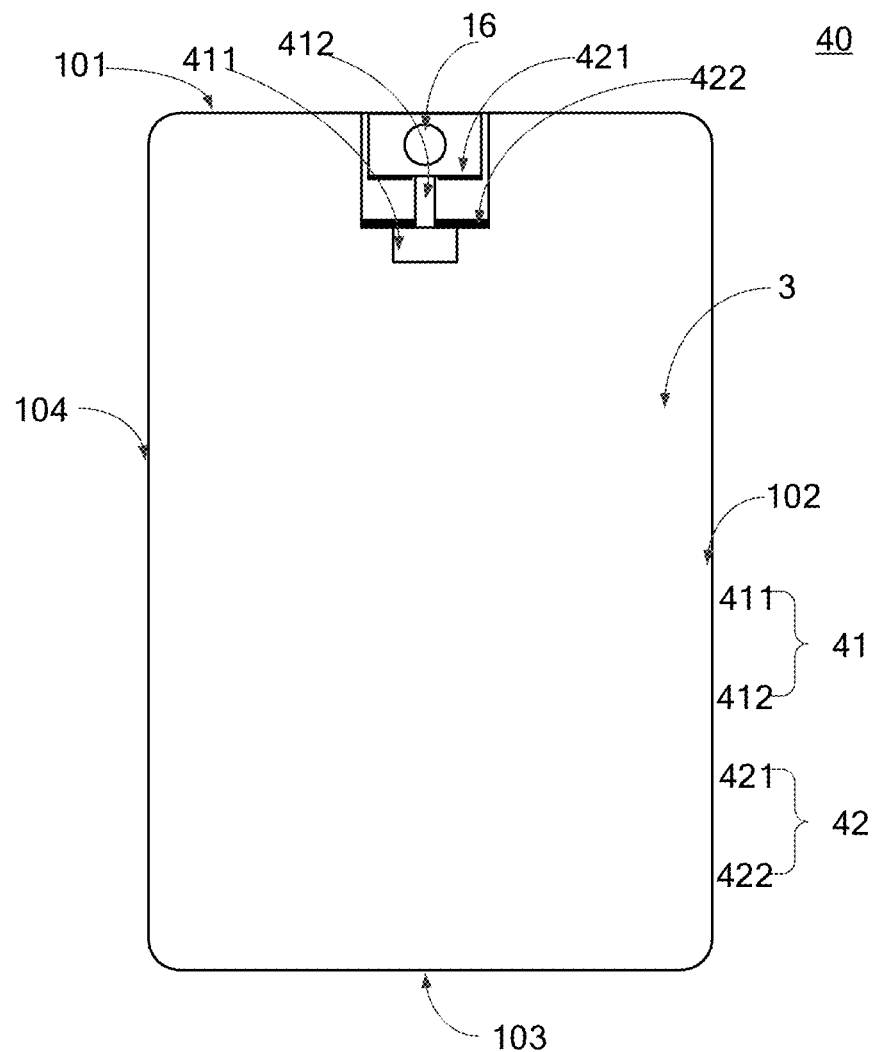
FIG. 5 is a schematic structural view of an electronic device according to an implementation of the present disclosure.

Referring to FIG. 5, an electronic device 40 further includes a rotating mechanism 41 and a pushing mechanism 42. The rotating mechanism 41, the pushing mechanism 42, and the camera module 16 are also disposed in a housing 3.

The rotating mechanism 41 is configured to drive the camera 16 to rotate in the housing 3. When the camera module 16 is driven to rotate to the preset orientation by the rotating mechanism 41, the pushing mechanism 42 drives the camera module 16 to move to the outside of the housing 3 (that is, the pushing mechanism 42 drives the camera module 16 to move beyond the periphery of the housing 3), such that a direction in which a camera of the camera module 16 faces can be switched according to actual needs.

In the implementations of the present disclosure, the pushing mechanism 42 is a driving mechanism configured to drive the camera module 16 to move to the outside of the housing 3 from the inside of the housing 3, or drive the camera module 16 to move back to the inside of the housing 3 from the outside of the housing 3. The rotating mechanism 41 is a driving mechanism configured to drive the camera module 16 to rotate.

It is noted that when the camera module 16 needs to perform shooting, the camera module 16 is rotated by a preset angle in advance. When the camera module 16 is rotated by the preset angle to the preset orientation, the pushing mechanism 42 drives the camera module 16 to move to the outside of the housing 3, and then the camera module 16 can perform shooting. In this way, not only the camera module 16 is hidden in the housing 3, but also a rotation of the camera module 16 is invisible. The camera module 16 is in the housing 3 and part of a motion trajectory of the camera module 16 (that is, a trajectory of the rotation of the camera module 16) is completed in the housing 3 and invisible, thereby simplifying an appearance of the electronic device 40 and facilitating user experience.

For example, neither the display surface nor the non-display surface of the electronic device defines a though hole for receiving the camera module 16 or transmission of incident light to the camera module 16, and instead, the camera module 16 is received in the housing 3. When the camera module 16 is at an initial position in which the camera of the camera module 16 is oriented toward (that is, faces) the non-display surface, the rotating mechanism 41 drives the camera assembly 16 to rotate to be oriented toward (that is, faces) the display surface before using as the front camera. When the camera of the camera module 16 is oriented toward a same direction as the display surface, the pushing mechanism 42 drives the camera module 16 to move beyond the periphery of the housing 3, and then the camera module 16 is able to be used as the front camera.

For another example, the camera module 16 is received in the housing 3, and the camera module 16 is at the initial position in which the camera of the camera module 16 is oriented toward (that is, faces) the display surface. The rotating mechanism 41 drives the camera assembly 16 to rotate to be oriented toward (that is, faces) the non-display surface before using as the rear camera. When the camera of the camera module 16 is oriented toward a same direction as the non-display surface, the pushing mechanism 42 drives the camera module 16 to move beyond the periphery of the housing 3, and then the camera module 16 is able to be used as the rear camera.

Of course, the camera of the camera module 16 at the initial position may or may not face the same direction as the display surface or the non-display surface. After the camera module 16 is rotated to the preset orientation, the camera of the camera module 16 may or may not face the same direction as the display surface or the non-display surface, that is, when the camera module 16 is at the preset orientation, the camera of the camera module 16 may or may not face the same direction as the display surface or the non-display surface. When the camera of the camera module 16 does not face the same direction as the display surface or the non-display surface, the camera module 16 can also be driven to move to the outside of the housing 3 by the pushing mechanism 42. For example, in an implementation, the sensor 18 is disposed in the housing 3, and the sensor 18 detects an orientation of the camera module 16. The user determines the preset orientation to which the camera module 16 needs to be rotated, and the sensor 18 detects the orientation of the camera module 16 during the rotation of the camera module 16. When the orientation of the camera module 16 detected by the sensor 18 is the same as the preset orientation of the camera module 16, the pushing mechanism 42 drives the camera module 16 to move to the outside of the housing 3.

In an implementation, the camera of the camera module 16 faces the same direction as the display surface or the non-display surface. The rotating mechanism 41 can drive the camera module 16 to rotate about a lateral axis of the camera module 16, and of course, the rotating mechanism 41 can also drive the camera module 16 to rotate about a longitudinal axis of the camera module 16. In an implementation, the rotating mechanism 41 can drive the camera module 16 to rotate 180 degrees about the lateral axis of the camera module 16, such that the camera module 16 is reversed about the lateral axis of the camera module 16 to the preset orientation. Alternatively, the rotating mechanism 41 can drive the camera module 16 to rotate 180 degrees about the longitudinal axis of the camera module 16, such that the camera module 16 is reversed about the longitudinal axis of the camera module 16 to the preset orientation. When the camera module 16 at the preset orientation is moved to the outside of the housing 3, the camera module 16 is able to be used as the front camera, and alternatively, when the camera module 16 at the preset orientation is moved to the outside of the housing 3, the camera module 16 is able to be used as the rear camera. For example, in an implementation, in an initial state, the camera module 16 is received in the housing 3 and faces the display surface (that is, a light incident surface of the camera module 16 is oriented/directed toward the display surface and is opposite to the non-display surface), the camera module 16 can be directly moved to the outside of the housing 3 such that the camera module 16 is able to be used as the front camera; alternatively, the camera module 16 can be first rotated 180 degrees about the lateral axis or the longitudinal axis of the camera module 16, and then the camera module 16 can be moved to the outside of the housing 3, such that the camera module 16 can be used as the rear camera. For another example, in an implementation, in the initial state, the camera module 16 is received in the housing 3 and faces the non-display surface (that is, the light receiving surface of the camera surface 16 is oriented/directed toward the non-display surface and is opposite to the display surface), the camera module 16 can be directly moved to the outside of the housing 3 such that the camera module 16 is able to be used as the rear camera; alternatively, the camera module 16 can be first rotated 180 degrees about the lateral axis or the longitudinal axis of the camera module 16, and then the camera module 16 can be moved to the outside of the housing 3, such that the camera module 16 can be used as the front camera. In this way, the camera module 16 can be switched between being used as the rear camera and being used as the front camera.

In an implementation, the camera module 16 is driven by the rotating mechanism 41 to rotate a preset angle about the lateral axis of the camera module 16, such that the camera module 16 rotates to the preset orientation. Alternatively, the camera module 16 is driven by the rotating mechanism 41 to rotate a preset angle about the longitudinal axis of the camera module 16, such that the camera module 16 rotates to the preset orientation. In an implementation, the preset angle is 180 degrees. In another implementation, the preset angle may be any angle other than 180 degrees.

It is noted that the rotating mechanism 41 can also drive the camera module 16 to rotate about other axes. For example, the camera module 16 is disposed at a corner of the electronic device 40, and the camera module 16 can be rotated about a diagonal of the camera module 16, so as to switch the camera module 16 from being used as the front camera to being used as the rear camera, or to switch the camera module 16 from being used as the rear camera to being used as the front camera. In the implementations of the present disclosure, a manner and a direction of the rotation of the camera module 16 are not limited herein.

In an implementation, the rotating mechanism 41 may be provided with a power mechanism to drive the camera module 16 to rotate, and of course, the camera module 16 may be rotated manually. The power mechanism may drive the camera module 16 via a driving motor 411, a magneto motive force, or the like. In this implementation, the rotating mechanism 41 can drive the camera module 16 to rotate in various manners, which are not limited to the examples illustrated in this implementation. It is noted that a manner in which the rotating mechanism 41 rotates is also not limited herein.

Figure 6:
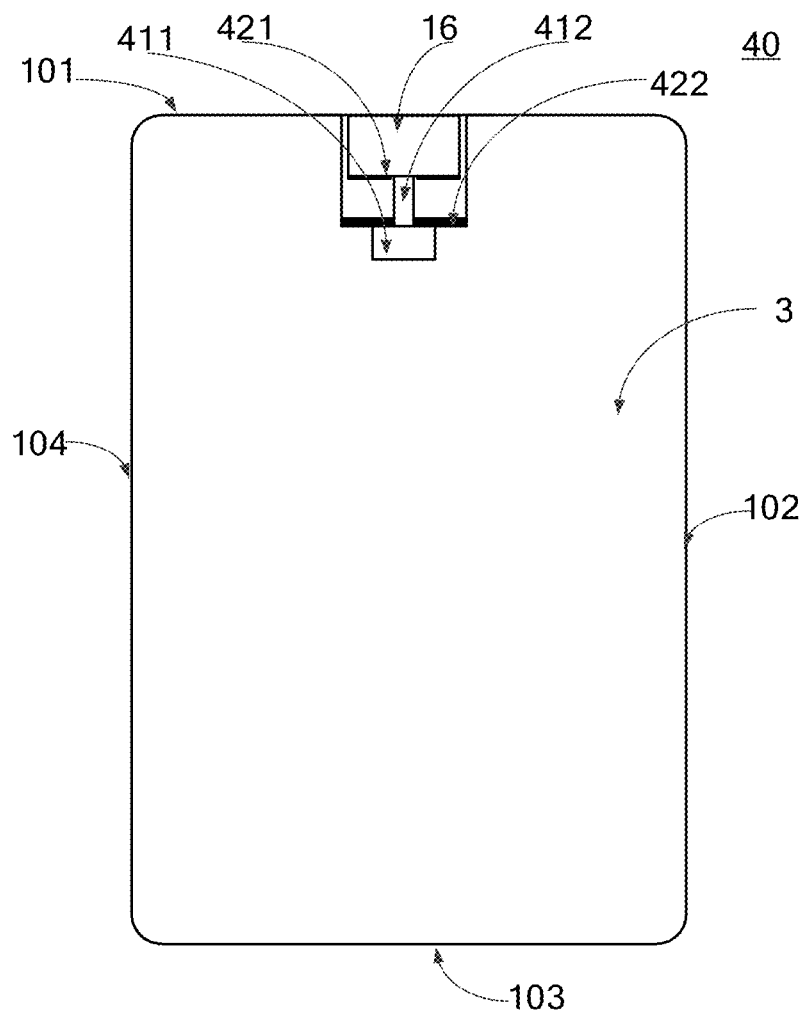
FIG. 6 is a schematic structural view of the electronic device illustrated in FIG. 5 with a rotating mechanism rotated 180 degrees according to an implementation of the present disclosure.

FIG. 5 is a schematic structural view of the electronic device 40 according to an implementation of the present disclosure. FIG. 6 is a schematic structural view of the electronic device 40 illustrated in FIG. 5 with the rotating mechanism 41 rotated 180 degrees according to an implementation of the present disclosure.

In some implementations, the rotating mechanism 41 includes the driving motor 411 and a telescopic rod 412. The driving motor 411 is disposed in the housing 3. The driving motor 411 is provided with a driving shaft fixedly connected with the telescopic rod 412. The telescopic rod 412 is in parallel with the longitudinal axis of the electronic device 40. The telescopic rod 412 is fixedly connected with the camera module 16. The driving motor 411 can drive the telescopic rod 412 to rotate, and a rotation of the telescopic rod 412 enables the camera module 16 to rotate.

Figure 7:
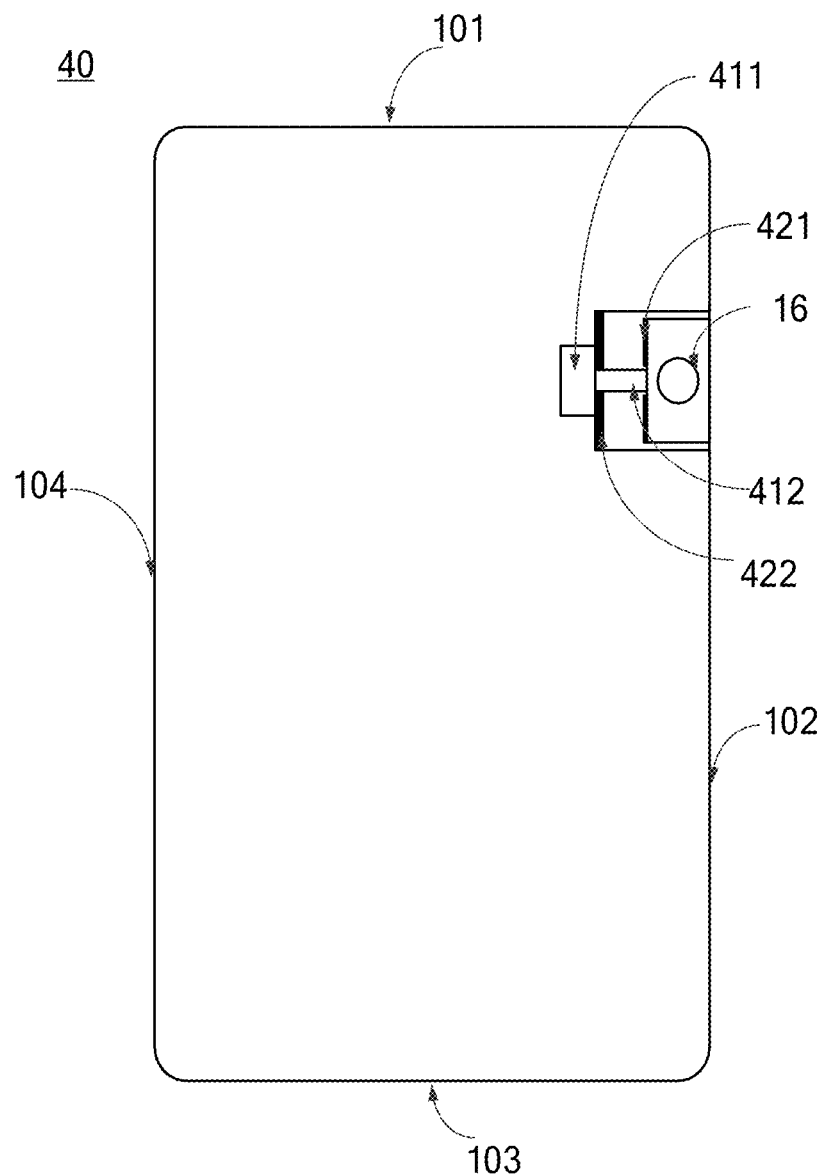
FIG. 7 is a schematic view of an electronic device according to an implementation of the present disclosure, illustrating a rotating mechanism of the electronic device being rotated 180 degrees.

As illustrated in FIG. 7, in some implementations, the telescopic rod 412 is in parallel with the lateral axis of the electronic device 40. The telescopic rod 412 is fixedly connected with the camera module 16. The driving motor 411 can drive the telescopic rod 412 to rotate, and the rotation of the telescopic rod 412 enables the camera module 16 to rotate.

Figure 10:
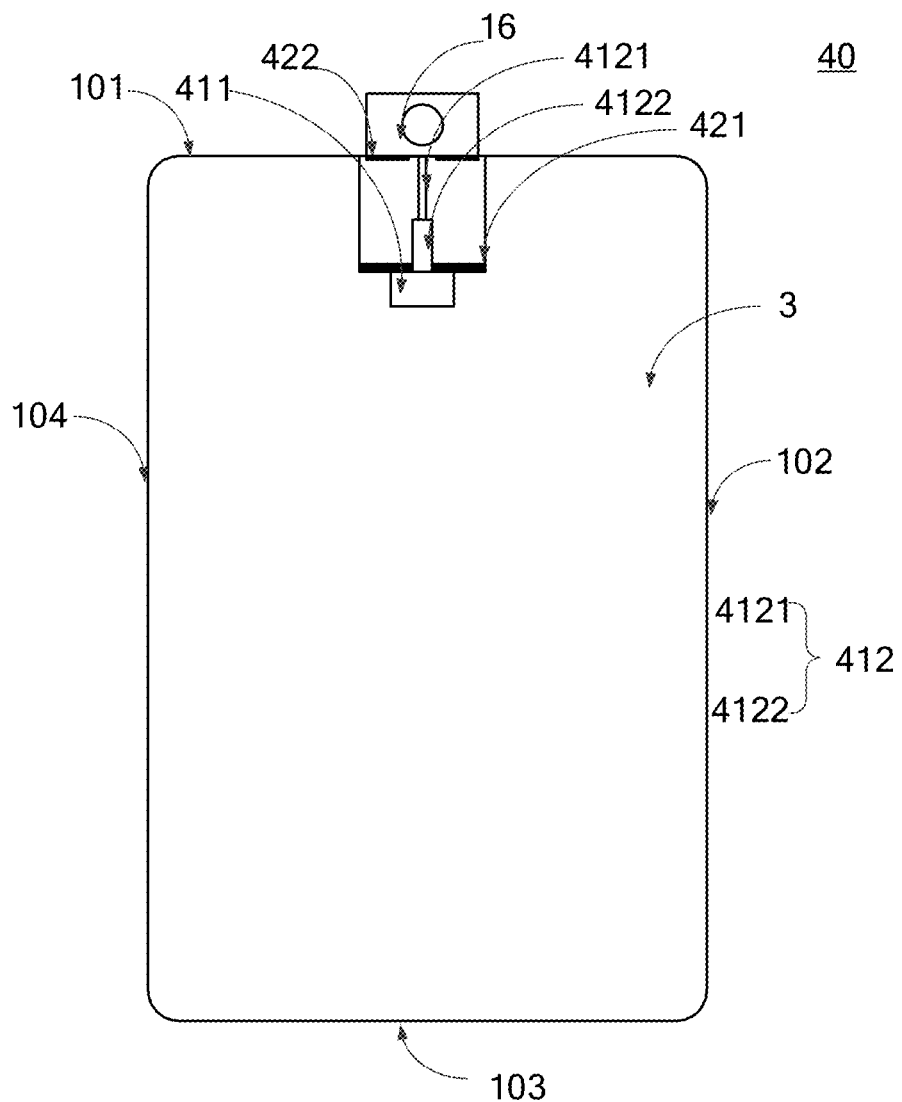
FIG. 10 is a schematic structural view of an electronic device with a pushing mechanism according to an implementation of the present disclosure.
Figure 11:
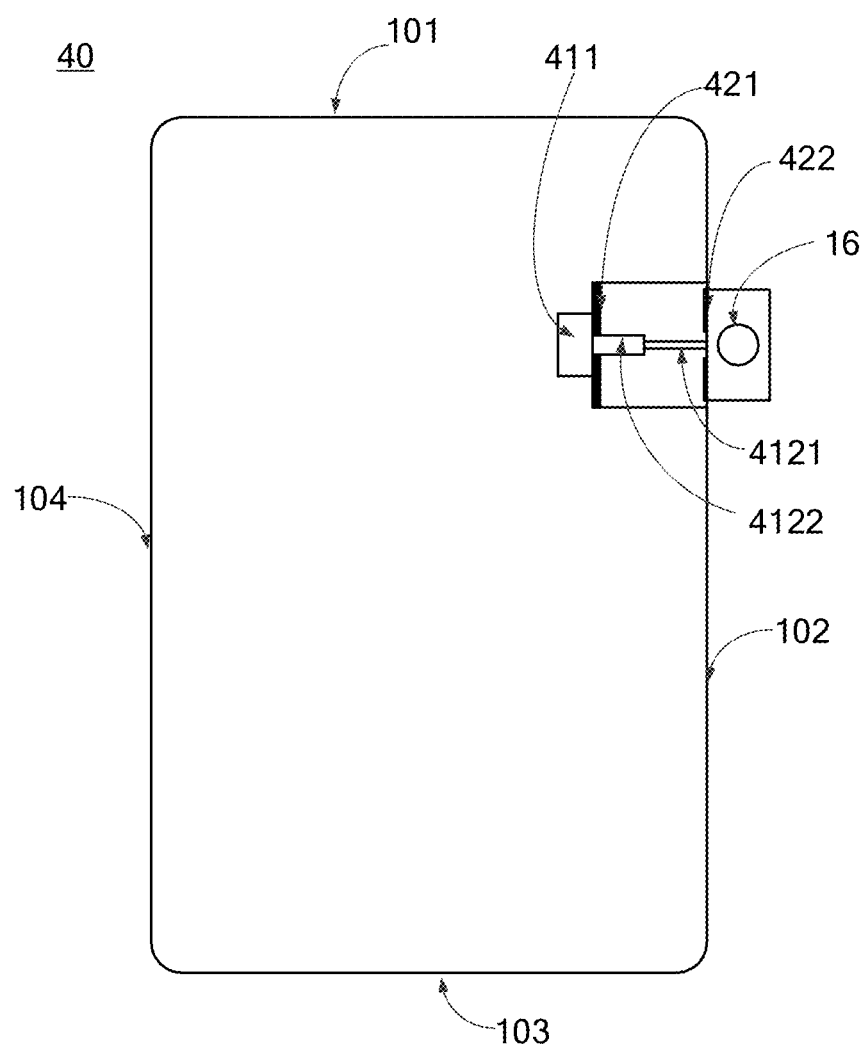
FIG. 11 is a schematic structural view of an electronic device with a pushing mechanism according to an implementation of the present disclosure.

As illustrated in FIGS. 10-11, the telescopic rod 412 may include a first rod 4121 and a second rod 4122. The second rod 4122 is sleeved on the first rod 4121. The first rod 4121 is operable to move in the second rod 4122 along a longitudinal direction of the second rod 4122. The second rod 4122 is provided with a limit block within the second rod 4122, so as to avoid a relative sliding movement between the first rod 4121 and the second rod 4122 in a lateral direction of the first rod 4121 and the second rod 4122. Of course, the telescopic rod 412 may also be an elastic rod. A structure of the telescopic rod 412 is not limited herein. The rotating mechanism 41 is coupled with the camera module 16 via the telescopic rod 412, such that the rotating mechanism 41 can drive the camera module 16 to rotate without interfering with the pushing mechanism 42 when the pushing mechanism 42 drives the camera module 16 to move to the outside of the housing 3.

Figure 8:
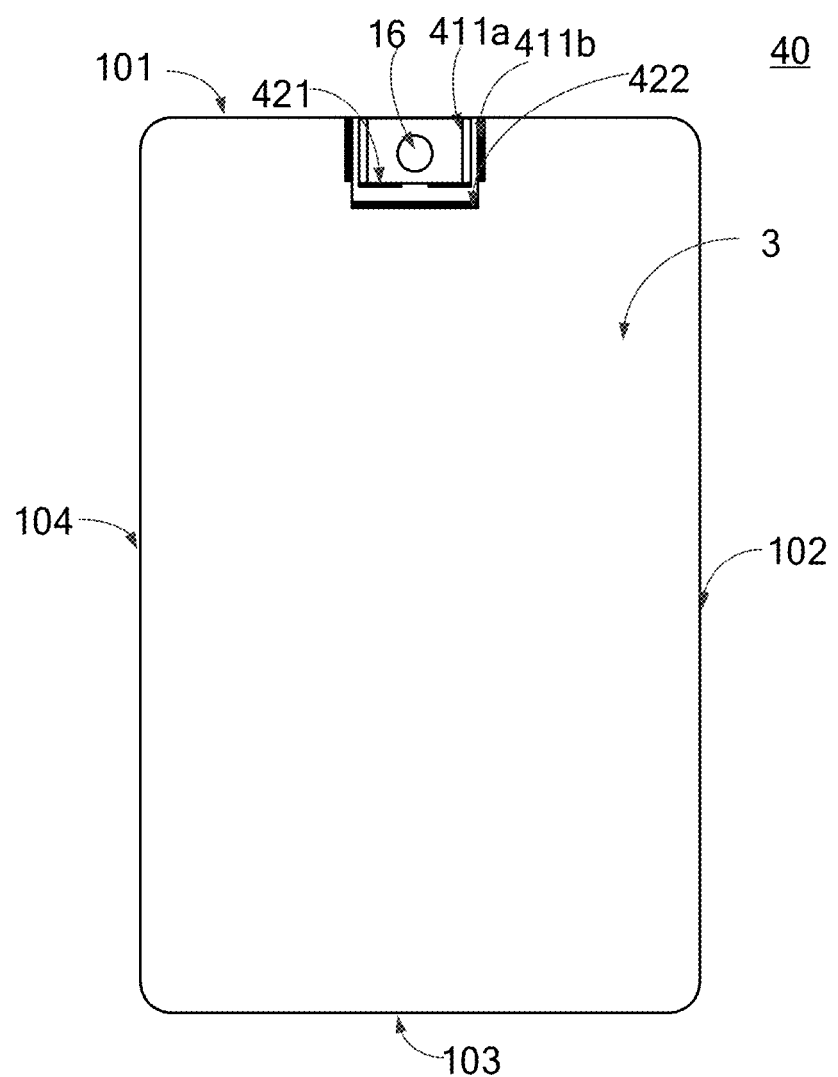
FIG. 8 is a schematic structural view of an electronic device with a rotating mechanism according to an implementation of the present disclosure.
Figure 9:
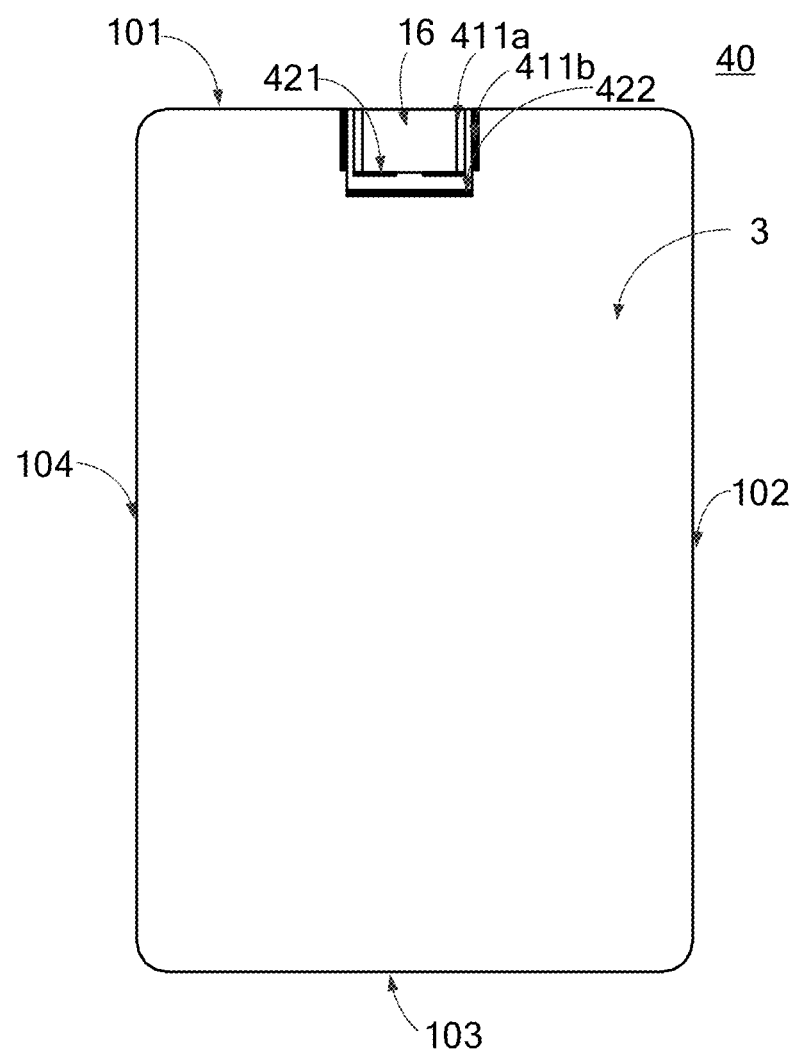
FIG. 9 is a schematic view of the electronic device illustrated in FIG. 8 according to an implementation of the present disclosure, illustrating the rotating mechanism of the electronic device being rotated 180 degrees.

As illustrated in FIG. 8 and FIG. 9, the rotating mechanism 41 includes a third magnetic member 411a and a fourth magnet 411b. The third magnetic member 411a is disposed on and surrounds a side wall of the camera module 16. The fourth magnet 411b is disposed in the housing 3. The fourth magnet 411b is in parallel with a side wall of the electronic device 40. The third magnetic member 411a is in parallel with and faces the fourth magnet 411b. The fourth magnet 411b drives the third magnetic member 411a to rotate about the longitudinal axis of the camera module 16. Of course, in an implementation, the fourth magnet 411b is perpendicular to the side wall of the electronic device 40, and the third magnetic member 411a is in parallel with and faces the fourth magnet 411b. The fourth magnet 411b drives the third magnetic member 411a to rotate about the lateral axis of the camera module 16. Through the above-mentioned structure, the camera module 16 can be rotated in the housing 3 without a complicated mechanical structure. In an implementation, a telescopic rod (which is not illustrated in FIGS. 8 to 9, references can be made to FIGS. 5 to 6) may be further disposed between the camera module 16 and the housing 3, such that the camera module 16 can stably move in the housing 3. It is noted that the telescopic rod may or may not be provided.

In an implementation, the housing 3 has four sidewalls surrounding the display surface. The pushing mechanism 42 is configured to drive the camera module 16 to move beyond any one of the four sidewalls from the inside of the housing 3. The four sidewalls of the housing 3 has a first sidewall 101, a second sidewall 103, a third sidewall 104, and a fourth sidewall 102.

In an implementation, the housing 3 includes a first outer sidewall. It is noted that the first outer sidewall may be one of the first sidewall 101, the third sidewall 104, the second sidewall 103, and the fourth sidewall 102 of the housing 3. It is noted that the first sidewall 101 refers to a top surface of the housing 3, the third sidewall 104 refers to a left surface of the housing 3, the second sidewall 103 refers to a bottom surface of the housing 3, and the fourth sidewall 102 refers to a right surface of the housing 3. For example, in an implementation, the top surface of the housing 3 is normally used as a surface through which radio signals pass, the bottom surface of the housing 3 is normally used as a surface in which a microphone hole is disposed, and the left surface of the housing 3 and the right surface of the housing 3 are normally held by a user's hand.

In some implementations, the camera module 16 is disposed in the housing 3. The pushing mechanism 42 can drive the camera module 16 to move beyond the first sidewall 101 of the housing 3 from an inside of the housing 3. In another implementation, the pushing mechanism 42 can drive the camera module 16 to move beyond the fourth sidewall 102 of the housing 3 from the inside of the housing 3. The pushing mechanism 42 can drive the camera module 16 to move beyond the second sidewall 103 of the housing 3 from the inside of the housing 3. The pushing mechanism 42 can drive the camera module 16 to move beyond the third sidewall 104 of the housing 3 from the inside of the housing 3.

In an implementation, the pushing mechanism 42 may be provided with at least one of a magnetic pushing mechanism, a driving motor, or an elastic pushing mechanism, so as to drive the camera module 16 to move. A manner in which the pushing mechanism 42 drives the camera module 16 to move to the outside of the housing 3 and a structure of the pushing mechanism 42 are not limited herein. For example, the pushing mechanism 42 can drive the camera module 16 to move to the outside of the housing 3 via a manual pressing or pulling. In an implementation, the pushing mechanism 42 includes a push-push ejection mechanism, so as to enable the camera module 16 to be pushed into the housing 3, and then pushed again to trigger the push-push ejection mechanism to eject the camera module 16 from the housing 3. For example, in an implementation, the pushing mechanism 42 includes a spring and a snap structure. The camera module 16 is snapped into the housing 3 via the snap structure. The spring is disposed in the housing 3 and abuts between the camera module 109 and the housing 3. Unlocking the snap structure enables the camera module 16 to be driven by the spring to move to the outside of the housing 3. In another implementation, the pushing mechanism 42 may also be a power mechanism, and the camera module 16 is driven to move to the outside of the housing 3 by the power mechanism. For example, the pushing mechanism 42 includes a motor and a connecting rod. The motor can drive the connecting rod to rotate. The connecting rod is coupled with the camera module 16. The connecting rod can drive the camera module 16 to move to the outside of the housing 3. Therefore, it is appreciated that the pushing mechanism 42 may be structured in various manners, which is not described in detail herein.

Figure 12:
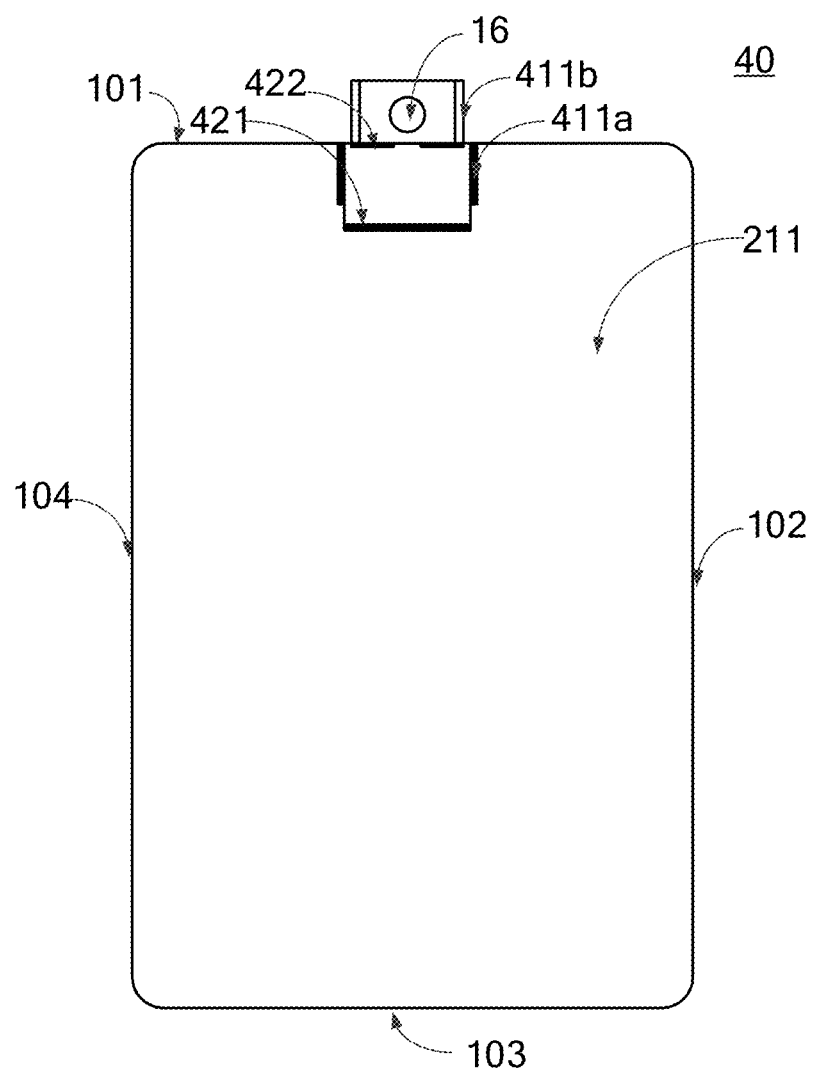
FIG. 12 is a schematic structural view of an electronic device with a pushing mechanism according to an implementation of the present disclosure.

As illustrated in FIG. 10 to FIG. 12, in some implementations, the pushing mechanism 42 includes a second magnetic member 422 and a first magnetic member 421. The second magnetic member 422 is disposed on the camera module 16. The first magnetic member 421 is disposed in the housing 3 and faces the second magnetic member 422. The first magnetic member 421 is configured to drive the second magnetic member 422 to move. In an implementation, when the first magnetic member 421 is energized, a magnetic field generated from the second magnetic member 422 interacts with the first magnetic member 421 to cause the second magnetic member 422 to be repelled by the first magnetic member 421, thereby driving the camera module 16 to move to the outside of the housing 3. Of course, when the second magnetic member 422 is energized with a current having an opposite direction, the second magnetic member 422 is attracted by the first magnetic member 421, so as to drive the camera module 16 to return back into the housing 3. The camera module 16 is controlled in this manner, so as to enable the electronic device 40 to be intelligent. Because the first magnetic member 421 is electrically controlled, a button may be displayed on an operating interface of the electronic device 40 to control energization and de-energization of the first magnetic member 421. When the camera module 16 needs to be switched from being used as a rear camera to being used as a front camera, the pushing mechanism 42 can be activated through the operating interface without pressing or pushing any other mechanical structures. In an implementation, for the electronic device 40 illustrated in FIG. 12, a telescopic rod (which is not illustrated in FIG. 12, references can be made to FIG. 10) may be further disposed between the camera module 16 and the housing 3, such that the camera module 16 can stably move in the housing 3. It is noted that the telescopic rod may or may not be provided.

In this implementation, the rotating mechanism 41 may be used alone or in combination with the pushing mechanism 42. In the implementations of the present disclosure, a combination of the rotating mechanism 41 and the pushing mechanism 42 is not limited, and various possible combinations of the rotating mechanism 41 and the pushing mechanism 42 to achieve a purpose of the present disclosure are available, which are not repeated herein.

As illustrated in FIGS. 5 to 12, an accommodating groove 50 is defined in the housing 3. The camera module 16 is received within the accommodating groove 50. In some implementations, referring to FIGS. 5 to 6, FIGS. 8 to 10, and FIGS. 11 to 12, the accommodating groove 50 extends from the inside of the housing 3 and passes through the first sidewall 101 of the housing 2 in a direction perpendicular to the first sidewall 101. The camera module 16 can be rotated in the accommodating groove 50 and driven to move along the accommodating groove 50. In some implementations, referring to FIG. 7 and FIG. 11, the accommodating groove 50 extends from the inside of the housing 3 and passes through the fourth sidewall of the housing 2 in a direction perpendicular to the fourth sidewall. The camera module 16 can be rotated in the accommodating groove 50 and driven to move along the accommodating groove 50.

It is noted that the accommodating groove 50 may extend from the inside of the housing 3 and passes through any portion of the middle frame of the housing 3 in any of other directions, such that the camera module 16 may be driven to the outside of the housing 3 along any of the other directions, which will not be repeated herein.

The electronic device 40 is provided according to the implementations of the present disclosure. The electronic device 40 includes the housing 3, the camera module 16, the rotating mechanism 41, and the pushing mechanism 42. The camera module 16 is disposed in the housing 3. The rotating mechanism 41 drives the camera module 16 to rotate within the housing 3. When the camera module 16 rotates to the preset orientation, the pushing mechanism 42 drives the camera module 16 to the outside of the housing 3. When the camera module 16 is needed to perform shooting, the rotating mechanism 41 drives the camera module 16 to rotate to adjust the orientation of the camera module 16 in the housing 3. When the camera module 16 rotates to a proper orientation, the pushing mechanism 42 drives the camera module 16 to move beyond the periphery of the housing 3 to perform shooting. In the implementations of the present disclosure, the camera module 16 can be driven to rotate, so as to perform shooting at various orientations with only one camera module 16, and thus a production cost of at least one camera is eliminated. Also, the structure of the camera module 16 does not occupy the display region of the electronic device 40, such that the electronic device 40 has a relative large display region, thereby facilitating a true full screen.

Figure 13:
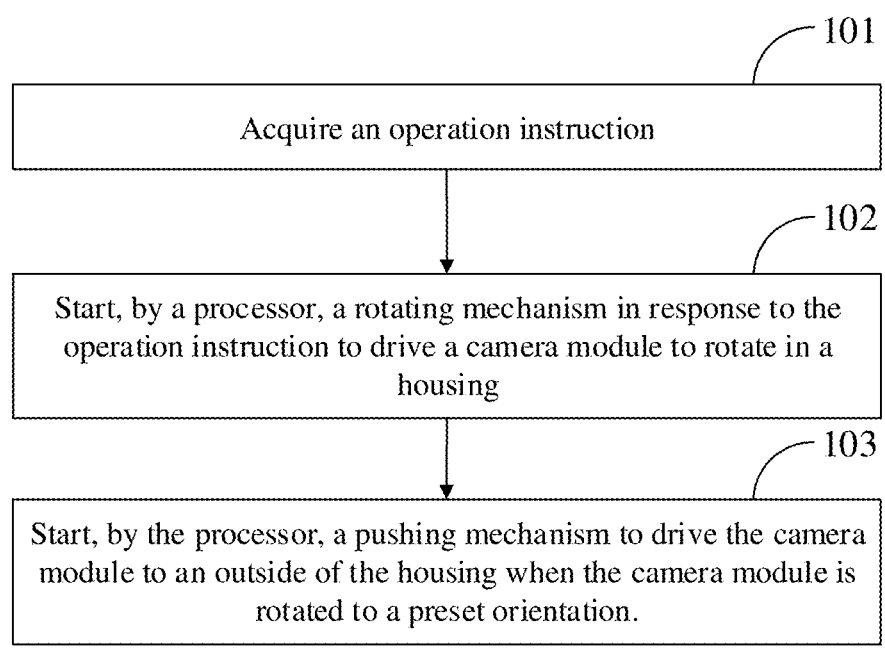
FIG. 13 is a flow chart illustrating a method for controlling a camera module according to an implementation of the present disclosure.

FIG. 13 is a flow chart illustrating a method for controlling the camera module 16 according to an implementation of the present disclosure. The method for controlling the camera module 16 applicable to the electronic device 40 is provided. The electronic device 40 includes the housing 3, the camera module 16, the pushing mechanism 42, and the rotating mechanism 41. The camera module 16, the pushing mechanism 42, the rotating mechanism 41, and a processor are all disposed in the housing 3. The pushing mechanism 42 and the rotating mechanism 41 are electrically coupled with the processor. The method for controlling the camera module 16 includes the following. At block 101, an operation instruction is acquired. At block 102, the processor starts the rotating mechanism 41 in response to the operation instruction to drive the camera module 16 to rotate in the housing 3. At block 103, the processor starts the pushing mechanism 42 to drive the camera module 16 to the outside of the housing 3 when the camera module 16 is rotated to the preset orientation.

In an implementation, operations carried out at block 102 includes the following. The processor starts the rotating mechanism in response to the operation instruction to drive the camera module to rotate in the housing about one of a lateral axis or a longitudinal axis of the camera module.

In an implementation, operations carried out at block 103 includes the following. The processor starts the pushing mechanism to drive the camera module to move beyond any one of four sidewalls of the housing when the camera module is rotated to the preset orientation, where the four sidewalls of the housing surround a display surface of the electronic device.

According to the above-mentioned electronic devices and the method for controlling the camera module applicable to the electronic device, an increased screen-to-body ratio of the electronic device is provided.

For example, in an implementation, the preset orientation is inputted by the user to the electronic device 40 via the operating interface of the electronic device 40, the rotating mechanism 41 is started, and then the rotating mechanism 41 drives the camera module 16 to rotate in the housing 3. When the camera module 16 rotates to the preset orientation, the pushing mechanism 42 drives the camera module 16 to move beyond the periphery of the housing 3.

The rotating mechanism 41 drives the camera module 16 to rotate within the housing 3. When the camera module 16 rotates to the preset orientation, the pushing mechanism 42 drives the camera module 16 to the outside of the housing 3. When the orientation of the camera module 16 needs to be switched to performing shooting, the rotating mechanism 41 drives the camera module 16 to rotate to adjust the orientation of the camera module 16 in the housing 3. When the camera module 16 is driven to rotate to be in the proper orientation, the pushing mechanism 42 drives the camera module 16 to move beyond the periphery of the housing 3 to perform shooting. In the implementations of the present disclosure, the camera module 16 can be driven to rotate, so as to perform shooting at various orientations with only one camera module 16, and thus the production cost of at least one camera is eliminated. Also, the structure of the camera module 16 does not occupy the region of the display region of the electronic device 40, such that the electronic device 40 has a larger display region, thereby facilitating the true full screen.

The electronic devices provided by the implementations of the present disclosure are introduced in detail in the foregoing, and specific examples are applied herein to set forth the principle and the implementations of the present disclosure, and the foregoing illustration of the implementations is only to help in understanding the present disclosure. Meanwhile, those of ordinarily skill in the art may make variations and modifications to the present disclosure in terms of the specific implementations and application scopes according to the ideas of the present disclosure. Therefore, the specification shall not be construed as limitations to the present disclosure.

What is claimed is:
1. An electronic device comprising:
   a housing;
   a camera module disposed in the housing;
   a rotating mechanism configured to drive the camera module to rotate inside the housing; and a pushing mechanism configured to drive the camera module to an outside of the housing when the camera module rotates to a preset orientation inside the housing; wherein the camera module has a first surface close to a periphery of the housing and a second surface opposite the first surface; and the pushing mechanism comprises a first magnetic member and a second magnetic member, wherein the first magnetic member is disposed on the second surface of the camera module, and the second magnetic member is disposed in the housing and faces the first magnetic member.

2. The electronic device of claim 1, wherein when the camera module at the preset orientation is moved to the outside of the housing, the camera module is able to be used as a front camera.

3. The electronic device of claim 1, wherein when the camera module at the preset orientation is moved to the outside of the housing, the camera module is able to be used as a rear camera.

4. The electronic device of claim 3, wherein the rotating mechanism is configured to drive the camera module to reverse about one of a lateral axis or a longitudinal axis of the camera module.

5. The electronic device of claim 3, wherein
the electronic device comprises a display surface and a non-display surface opposite the display surface; and
the pushing mechanism is configured to drive the camera module to move in a direction parallel to the display surface.

6. The electronic device of claim 5,
wherein the housing has four sidewalls surrounding the display surface; and
the pushing mechanism is configured to drive the camera module to move beyond one of the four sidewalls from an inside of the housing.

7. The electronic device of claim 3, wherein the rotating mechanism comprises a driving motor and a telescopic rod, wherein the driving motor is fixedly connected with the telescopic rod, the telescopic rod is coupled with the camera module, the driving motor is configured to drive the telescopic rod to rotate, and a rotation of the telescopic rod enables the camera module to rotate.

8. The electronic device of claim 7, wherein
the telescopic rod is in parallel with a longitudinal axis of the electronic device; and
the telescopic rod comprises a first rod and a second rod, wherein the second rod is sleeved on the first rod, and the first rod is operable to move in the second rod along a longitudinal direction of the second rod.

9. The electronic device of claim 7, wherein
the electronic device further comprises a sensor disposed in the housing and configured to detect an orientation of the camera module; and
the pushing mechanism is configured to drive the camera module to move to the outside of the housing, when the orientation detected by the sensor is the same as the preset orientation of the camera module.

10. An electronic device comprising a housing, a camera module, a pushing mechanism, a rotating mechanism, and a processor, wherein
the camera module, the pushing mechanism, the rotating mechanism, and the processor are all disposed in the housing;
the pushing mechanism and the rotating mechanism are electrically coupled with the processor; and the processor is configured to control the rotating mechanism to drive the camera module to rotate inside the housing, and configured to control the pushing mechanism to drive the camera module to move to an outside of the housing when the camera module is at a preset orientation inside the housing; wherein the camera module has a first surface close to a periphery of the housing and a second surface opposite the first surface; and the pushing mechanism comprises a first magnetic member and a second magnetic member, wherein the first magnetic member is disposed on the second surface of the camera module, and the second magnetic member is disposed in the housing and faces the first magnetic member.

11. The electronic device of claim 10, wherein when the camera module at the preset orientation is moved to the outside of the housing, the camera module is able to be used as a front camera.

12. The electronic device of claim 10, wherein when the camera module at the preset orientation is moved to the outside of the housing, the camera module is able to be used as a rear camera.

13. The electronic device of claim 12, wherein the rotating mechanism is configured to drive the camera module to reverse about a lateral axis of the camera module.

14. The electronic device of claim 12, wherein
the electronic device comprises a display surface and a non-display surface opposite the display surface; and
the housing has four sidewalls surrounding the display surface; and
the pushing mechanism is configured to drive the camera module to move beyond one of the four sidewalls from an inside of the housing.

15. The electronic device of claim 12, wherein the rotating mechanism comprises a driving motor and a telescopic rod, wherein the driving motor is fixedly connected with the telescopic rod, the telescopic rod is coupled with the camera module, the driving motor is configured to drive the telescopic rod to rotate, and a rotation of the telescopic rod enables the camera module to rotate.

16. A method for controlling a camera module applicable to an electronic device, wherein
the electronic device comprises a housing, a camera module, a pushing mechanism, and a rotating mechanism, wherein the camera module, the pushing mechanism, the rotating mechanism, and a processor all are disposed in the housing, and the pushing mechanism and the rotating mechanism are electrically coupled with the processor; and
the camera module has a first surface close to a periphery of the housing and a second surface opposite the first surface; and
the pushing mechanism comprises a first magnetic member and a second magnetic member, wherein the first magnetic member is disposed on the second surface of the camera module, and the second magnetic member is disposed in the housing and faces the first magnetic member;
the method comprises:
acquiring an operation instruction;
starting, by the processor, the rotating mechanism in response to the operation instruction to drive the camera module to rotate inside the housing; and
starting, by the processor, the pushing mechanism to drive the camera module to an outside of the housing when the camera module is rotated to a preset orientation inside the housing.

17. The method of claim 16, wherein starting, by the processor, the rotating mechanism in response to the operation instruction to drive the camera module to rotate in the housing comprises:

starting, by the processor, the rotating mechanism in response to the operation instruction to drive the camera module to rotate in the housing about one of a lateral axis or a longitudinal axis of the camera module.

18. The method of claim 16, wherein starting, by the processor, the pushing mechanism to drive the camera module to the outside of the housing when the camera module is rotated to the preset orientation comprises:

starting, by the processor, the pushing mechanism to drive the camera module to move beyond one of four sidewalls of the housing when the camera module is rotated to the preset orientation, wherein the four sidewalls of the housing surround a display surface of the electronic device.

* * * * *